(12) United States Patent
Ito (10) Patent No.: US 8,438,411 B2
(45) Date of Patent: May 7, 2013

(54) INFORMATION PROCESSING APPARATUS, CONTROL METHOD OF INFORMATION PROCESSING APPARATUS, AND PROGRAM

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/783,365

(22) Filed: May 19, 2010

(65) Prior Publication Data

US 2010/0332878 A1 Dec. 30, 2010

(30) Foreign Application Priority Data

Jun. 26, 2009 (JP) ................................. 2009-152625

(51) Int. Cl.
*G06F 1/32* (2006.01)
*G06F 13/10* (2006.01)

(52) U.S. Cl.
USPC ........................................... 713/323; 710/14

(58) Field of Classification Search .................... 713/323
See application file for complete search history.

(56) References Cited

U.S. PATENT DOCUMENTS

| 7,222,252 B2* | 5/2007 | Dutton et al. ................. 713/323 |
| 7,561,286 B2* | 7/2009 | Suto ............................. 358/1.14 |
| 7,743,267 B2* | 6/2010 | Snyder et al. ................ 713/320 |
| 2006/0077423 A1 | 4/2006 | Mathieson |
| 2008/0317234 A1* | 12/2008 | Di Fabbrizio et al. ... 379/211.01 |

FOREIGN PATENT DOCUMENTS

| CN | 101251729 A | 8/2008 |
| JP | 2006127503 A | 5/2006 |
| JP | 2008205714 A | 9/2008 |

OTHER PUBLICATIONS

Chinese Office Action for Application No. 201010212326.2 dated Apr. 11, 2012.

* cited by examiner

*Primary Examiner* — Kim Huynh
*Assistant Examiner* — Eric Chang
(74) *Attorney, Agent, or Firm* — Carter, DeLuca, Farrell & Schmidt LLP (57) ABSTRACT

In an information processing apparatus which is connected to a Web server and equipped with a Web browser for displaying an operation screen provided by the Web server and a processing unit for processing image data, an access from the Web browser to the Web server is detected, and, in a case where the Web browser accesses to the Web server, the processing unit is activated according to a content of the detected access.

7 Claims, 7 Drawing Sheets

| URL | SCANNER | PRINTER | |
|---|---|---|---|
| http://www.hoge1.html | TRUE | FALSE | 501 |
| http://www.hoge2.html | FALSE | TRUE | 502 |
| http://www.hoge3.html | TRUE | TRUE | 503 |
| ... | ... | ... | |

INFORMATION PROCESSING APPARATUS, CONTROL METHOD OF INFORMATION PROCESSING APPARATUS, AND PROGRAM

BACKGROUND OF THE INVENTION

1. Field of the Invention

The present invention relates to an information processing apparatus which is connected to a Web server and is equipped with a Web browser for displaying an operation screen provided by the Web server, a control method of the information processing apparatus, and a program for causing a computer to perform the control method of the information processing apparatus.

2. Description of the Related Art

It is known that an information processing apparatus such as a PC (personal computer) or the like is connected to a Web server on a network and an operation screen provided by the Web server is displayed on a Web browser of the information processing apparatus.

In such a case, the Web browser of the information processing apparatus makes a request to the Web server for the operation screen. Then, in response to the request from the information processing apparatus, a Web application on the Web server transmits, to the information processing apparatus, an HTML (Hyper Text Markup Language) file for displaying the operation screen on the Web browser. Subsequently, the Web browser of the information processing apparatus analyzes the received HTML file, and thus displays the operation screen based on the description of the analyzed HTML file.

Further, if a user inputs an instruction through the operation screen displayed on the Web browser, the Web browser notifies the Web server of the input instruction. Then, the Web application on the Web server, which received such a notification, performs a process according to the input instruction.

Recently, among various kinds of MFPs (multi function peripherals) each of which has a scanner and a printer, there are the MFPs each of which is equipped with the above-described Web browser. Under the circumstances, each of the MFPs displays the operation screen provided by the Web server by using such a procedure as described above on its Web browser to accept various instructions from the user.

Further, a technique as disclosed in Japanese Patent Application Laid-Open No. 2006-127503 has been proposed. Namely, in Japanese Patent Application Laid-Open No. 2006-127503, an operation screen for inputting an instruction to use each function of an MFP is provided by a Web server. That is, a user of the MFP inputs the instruction to the MFP through the operation screen displayed on a Web browser of the MFP. Then, the input instruction is notified to the Web server by the Web browser of the MFP.

Subsequently, the Web server which received such a notification makes a request to the MFP for performing various processes according to the contents of the instruction input by the user. Then, the MFP, which received the request, performs the requested process. Thus, it is unnecessary to hold, in the MFP, all menu data for operating the MFP. Moreover, it is possible to easily change the menu data on the Web server.

In the meantime, an MFP, which operates as changing over an operation mode between a normal power mode and a power saving mode of which the power consumption is smaller than that in the normal power mode, is known (for example, Japanese Patent Application Laid-Open NO. 2008-205714). In the MFP like this, if the MFP is not used for a long time, power supply to each processing unit is stopped. Thus, it is possible to bring about an effect of power saving.

Here, as disclosed in Japanese Patent Application Laid-Open No. 2008-205714, if a user intends to perform a job by the MFP which is in a state of the power saving mode, a process to return the operation mode to the normal power mode is performed after a process request is received by the MFP. For this reason, since a time for returning the operation mode to the normal power mode is necessary after the user instructs to perform the process, there is a problem that a start of the job is often delayed.

In particular, as disclosed in Japanese Patent Application Laid-Open No. 2006-127503, if the user instructs to perform the process through the operation screen displayed on the Web browser, the Web server detects the instruction of the user, and then the Web server requests the MFP to perform the process. Thus, it further takes a long time from the user's instruction of the performance of the process to the actual start of the performance of the job.

SUMMARY OF THE INVENTION

The present invention has been completed in consideration of such problems as described above, and aims to provide a mechanism of, in a case where a Web browser accesses to a Web server, activating a processing unit according to a content of an access from the Web browser to the Web server.

To achieve such an object, the present invention is characterized by an information processing apparatus which is connected to a Web server and equipped with a Web browser for displaying an operation screen provided by the Web server, comprising: a processing unit configured to perform a process of image data; a detection unit configured to detect an access from the Web browser to the Web server; and a control unit configured to, in a case where the Web browser accesses to the Web server, activate the processing unit according to a content of the access detected by the detection unit.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the attached drawings. By the way, it should be noted that the following embodiments do not limit the scope of the invention as described in the appended claims, and that all the combinations of the features described in the embodiments are not necessarily indispensable to the solution of the invention.

Embodiment of the Invention

Figure 1:
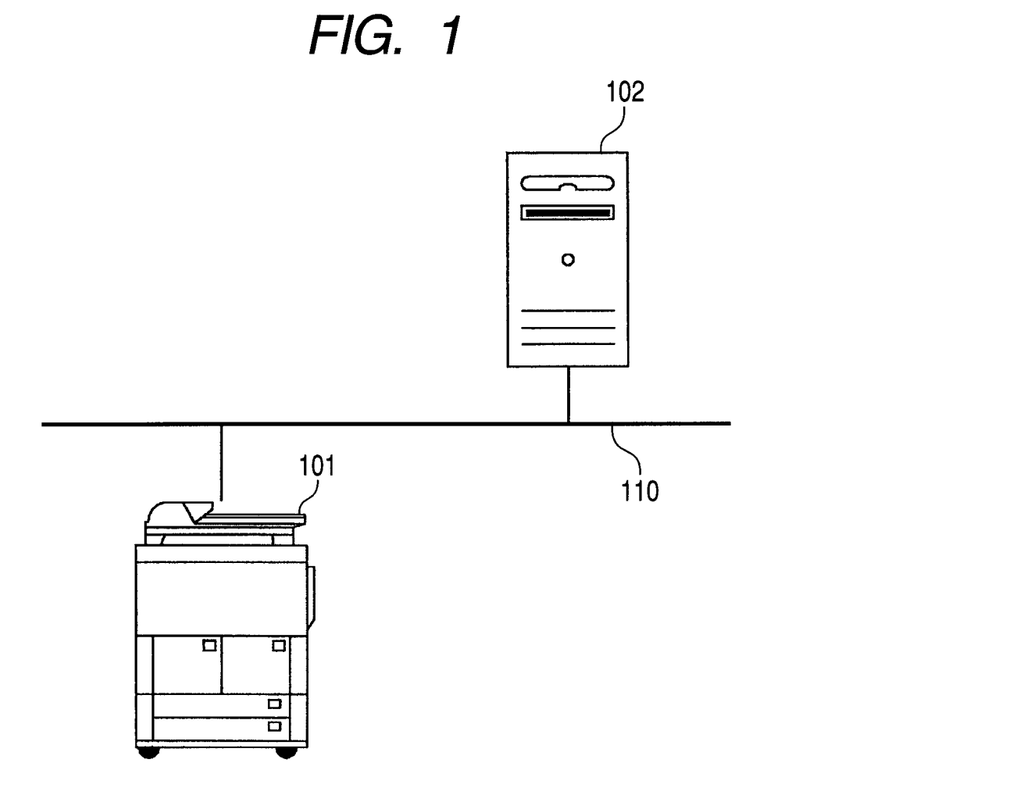
FIG. 1 is an overall diagram of an information processing system according to the embodiment of the present invention.

FIG. 1 is an overall diagram of an information processing system according to the present embodiment. An MFP 101 and a Web server 102 which can communicate with each other are connected with a LAN (local area network) 110.

Figure 2:
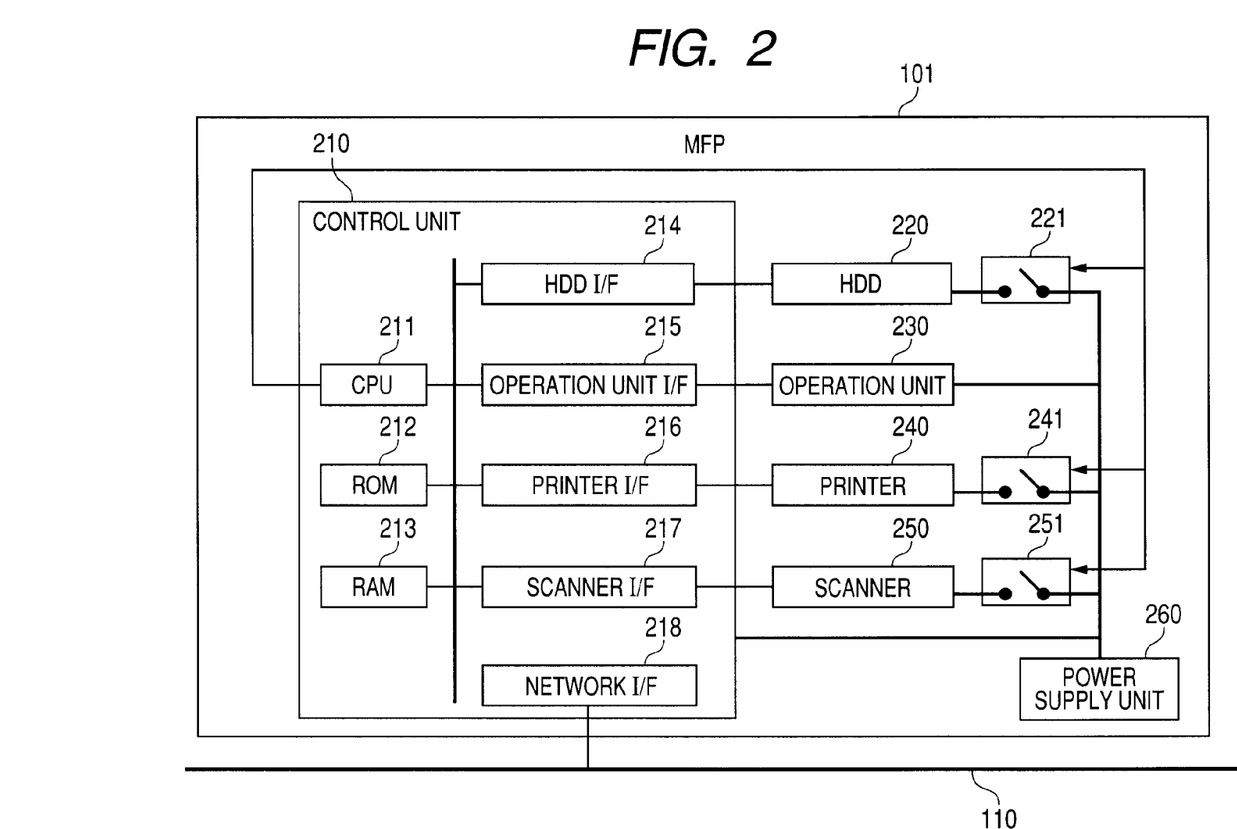
FIG. 2 is a block diagram indicating the constitution of an MFP 101 according to the embodiment of the present invention.

FIG. 2 is a block diagram indicating the constitution of the MFP 101. A control unit 210 which includes a CPU (central processing unit) 211 controls the operation of the whole MFP 101. The CPU 211 reads out control programs stored in a ROM 212 to perform various control processes such as a read control, a transmission control and the like. A RAM 213 is used as a main memory of the CPU 211 and a temporary storage area such as a work area or the like.

An HDD I/F (hard disk drive interface) 214 connects an HDD 220 with the control unit 210. The HDD 220 stores image data, various programs or a various information table to be described later. An operation unit I/F (interface) 215 connects an operation unit 230 with the control unit 210. A liquid crystal display unit having a touch panel function, keyboards and the like are provided in the operation unit 230. A Web browser function to be described later is provided in the MFP 101, and a Web browser of the MFP 101 analyzes an HTML file received from the Web server 102 and displays an operation screen based on the description of the received HTML file on the liquid crystal display unit of the operation unit 230.

A printer I/F 216 connects a printer 240 with the control unit 210. Image data, which is to be printed at the printer 240, is transferred from the control unit 210 through the printer I/F 216 and is printed on a recording medium in the printer 240.

A scanner I/F 217 connects a scanner 250 with the control unit 210. The scanner 250 reads an image on an original and generates image data, which is input to the control unit 210 through the scanner I/F 217.

A power supply unit 260 supplies the power which is required for operating the control unit 210, the HDD 220, the operation unit 230, the printer 240 and the scanner 250. Among these items, switches 221, 241 and 251 are respectively provided for the HDD 220, the printer 240 and the scanner 250, and the power supplied from the power supply unit 260 to the respective processing units is interrupted by a process that the CPU 211 controls these switches.

That is, the MFP 101 can operate at either a normal power mode or a power saving mode of which the power consumption is less than that of the normal power mode. In a state of operating at the power saving mode, the power supply to specific processing units (for example, the HDD 220, the printer 240 and the scanner 250) is stopped.

Here, although it is assumed that the power is supplied to the control unit 210 and the operation unit 230 during a period of operating at the power saving mode, for example, it is allowed that the power supply to the CPU 211 is stopped when shifting to the power saving mode. In this case, another CPU which is used to control the operation unit 230, to which the power is supplied even at the power saving mode, or a network I/F 218 and used to perform a process of returning to the normal power mode is to be provided.

As a method of reducing the power consumption, another method different from the above-described power supplying system may be adopted. For example, a method of suppressing the power to be consumed by lowering the clock frequency may be used.

The network I/F 218 connects the control unit 210 (MFP 101) with the LAN 110. The network I/F 218 transmits image data or information to an external apparatus (for example, the Web server 102) on the LAN 110 or receives various information from the external apparatus on the LAN 110.

Figure 3:
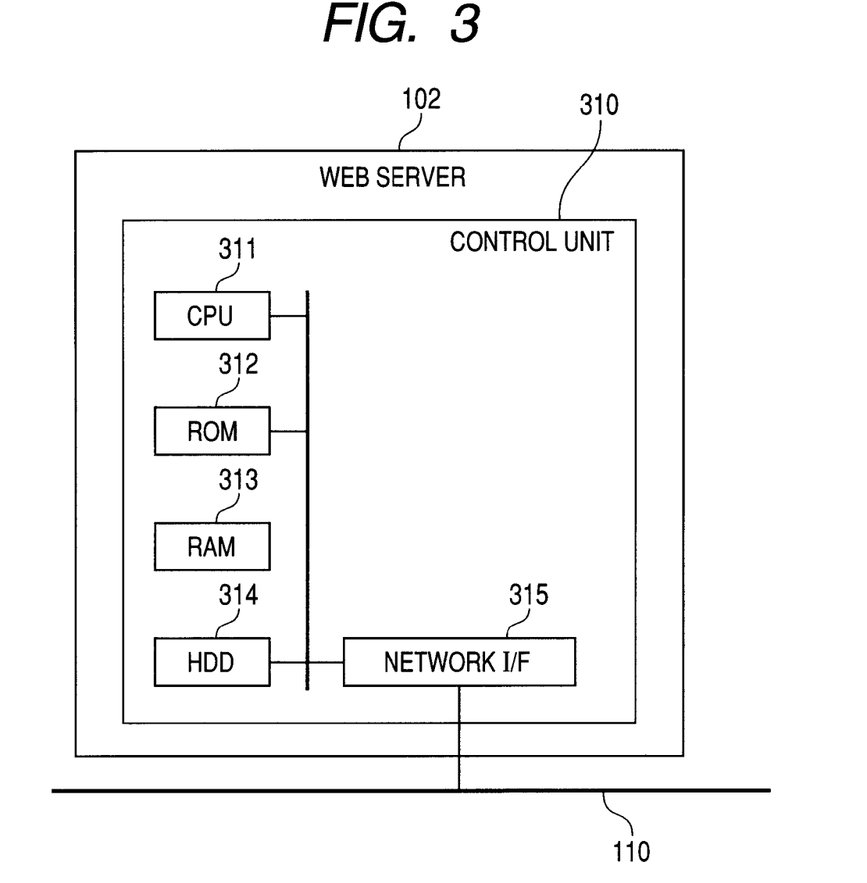
FIG. 3 is a block diagram indicating the constitution of a Web server 102 according to the embodiment of the present invention.

FIG. 3 is a block diagram indicating the constitution of the Web server 102. A control unit 310 which includes a CPU 311 controls the operation of the whole Web server 102. The CPU 311 reads out control programs stored in a ROM 312 to perform various control processes. A RAM 313 is used as a main memory of the CPU 311 and a temporary storage area such as a work area or the like. An HDD 314 stores image data, various programs or a various information table to be described later.

A network I/F 315 connects the control unit 310 (Web server 102) with the LAN 110. The network I/F 315 transmits and receives various information between the network I/F 315 and another apparatus on the LAN 110.

Figure 4:
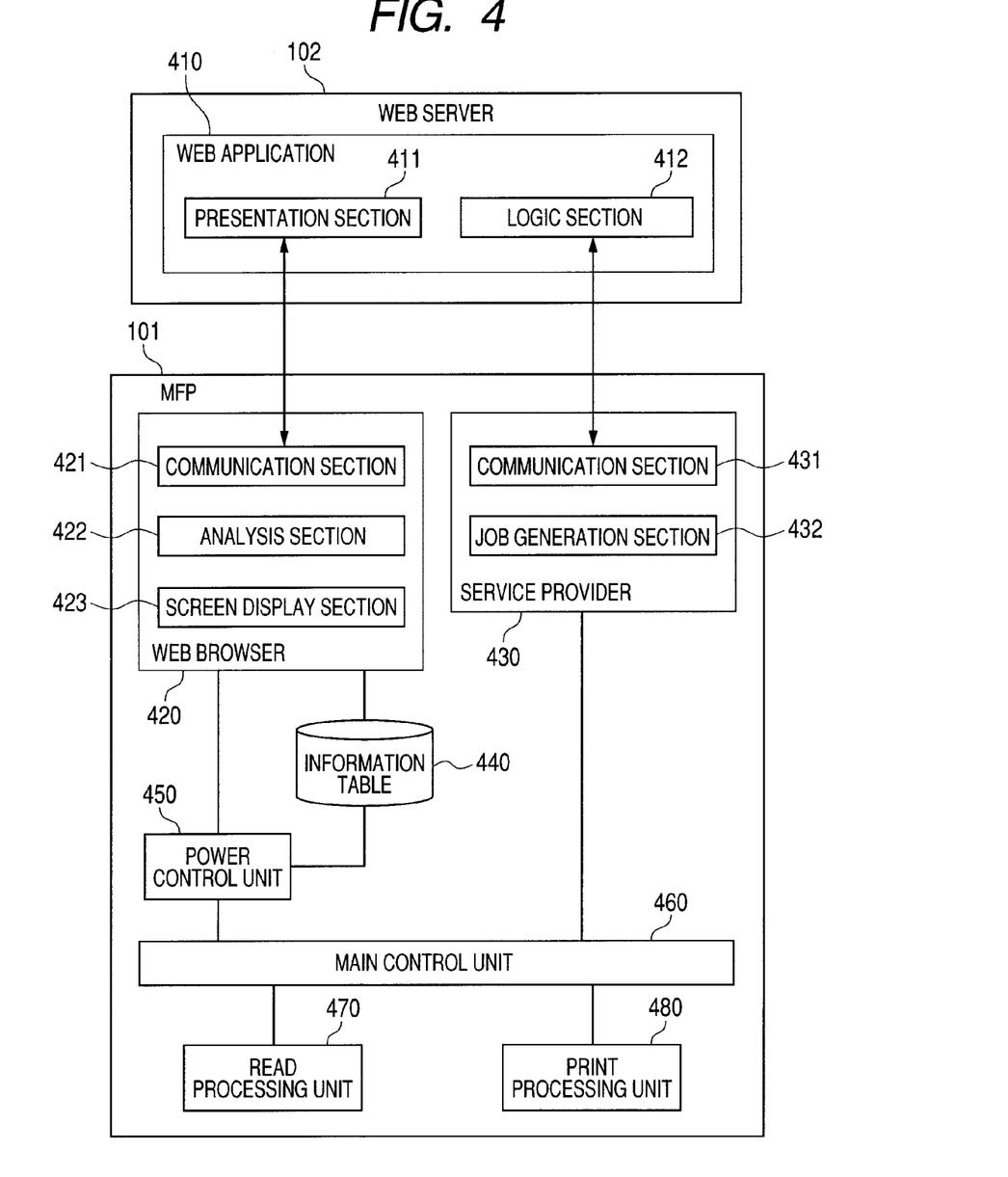
FIG. 4 is a diagram indicating software configuration of the information processing system according to the embodiment of the present invention.

FIG. 4 is a diagram for describing software configuration of a whole information processing system. Functions of respective functional sections indicated in FIG. 4 are realized by a process that CPUs respectively provided in the MFP 101 and the Web server 102 perform control programs.

The MFP 101 has a Web browser 420 and a service provider 430. The Web browser 420 includes a communication section 421, an analysis section 422 and a screen display section 423. The communication section 421 communicates with a presentation section 411 of a Web application 410 in accordance with the HTTP (Hyper Text Transfer Protocol). More specifically, the communication section 421 requests an operation screen to be displayed with the Web browser for the Web application 410 or notifies instructions of a user input through the operation screen displayed with the Web browser to the Web application 410. Incidentally, information necessary to associate URLs (Uniform Resource Locators) to be registered in an information table 440 to be described later with respective processing sections are included in an extension field of the HTTP.

The analysis section 422 analyzes an HTML file to be received from the Web application 410. The description of indicating the content of an operation screen to be displayed on the Web browser is included in this HTML file. The screen display section 423 displays an operation screen on the operation unit 230 on the basis of the analyzed result obtained by the analysis section 422.

The Web application 410, which includes the presentation section 411 and a logic section 412, is provided in the Web server 102.

The presentation section 411 communicates with the communication section 421 and transmits the operation screen to be displayed with the Web browser of the MFP 101 to the MFP 101 upon responding to a request from the MFP 101. In addition, the presentation section 411 receives instructions from a user input through the operation screen displayed on the Web browser of the MFP 101 from the MFP 101.

The Web application 410 which received the instructions from the user performs various processes in accordance with the content of the instructions and requests the MFP 101 to perform processes in accordance with necessity. More specifically, the Web application 410 requests to perform a printing process by the printer 240 of the MFP 101, a reading process by the scanner 250 of the MFP 101 or a transmission process through the network I/F 218.

In this manner, in case of requesting to perform the processes for the MFP 101, the logic section 412 communicates with a communication section 431 in the service provider 430 provided in the MFP 101. The communication between the logic section 412 and the communication section 431 is performed in accordance with the SOAP (Simple Object Access Protocol)/HTTP (Hyper Text Transfer Protocol).

The service provider 430 includes the communication section 431 and a job generation section 432. The communication section 431 accepts a request of performing a process sent from the logic section 412 in the Web application 410. When it is requested to perform the process from the Web application 410, the job generation section 432 generates a job for performing the requested process and performs the job.

A read processing unit 470 performs a reading process of using the scanner 250. In addition, a print processing unit 480 performs a printing process of using the printer 240. A main control unit 460 controls the respective functional sections of the MFP 101 and controls the switches 221, 241 and 251 in accordance with instructions from a power control unit 450 and then switches the power modes.

Figure 5:
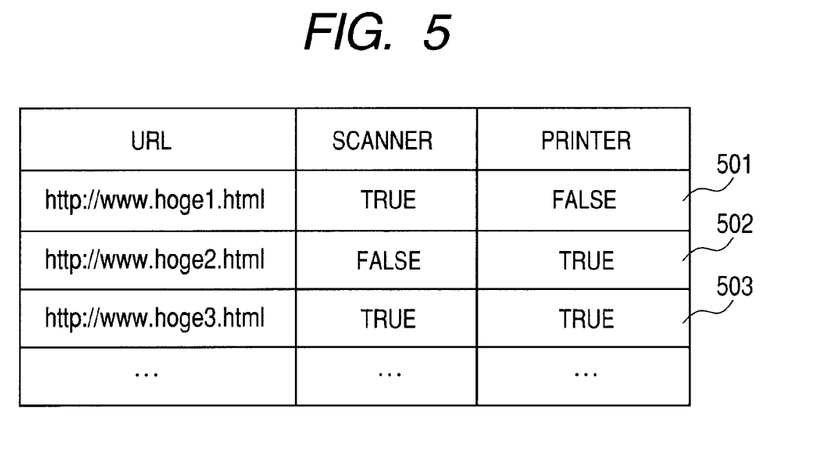
FIG. 5 is a diagram indicating an information table 440 according to the embodiment of the present invention.

FIG. 5 is a diagram indicating a state that the URLs, which are registered in the information table 440 and becomes access destinations of the Web browser 420, are associated with the respective processing units (the printer 240 or the scanner 250) in the MFP 101. Incidentally, it is assumed that the information table 440 is stored in the HDD 220 of the MFP 101.

In a record 501 indicated in FIG. 5, values of "scanner=true" and "printer=false" are respectively registered to be associated with a URL of "http://www.hoge1.html". This state indicates that the scanner 250 has to be activated and the printer 240 has not to be activated when the Web browser 420 accesses the URL of "http://www.hoge1.html".

That is, when the URL of "http://www.hoge1.html" corresponds to the Web page concerning a reading process, from a fact of accessing this URL, it can be expected that a request of performing the reading process is given from the Web server 102 in a short time. Therefore, at a time when the request of performing the process is received from the Web server 102, the scanner 250 can be set in an activated state (or a state capable of immediately activating) by activating the scanner 250 in parallel with an operation of accessing the Web server 102. That is, a job based on the request from the Web server 102 can be earlier started to perform it.

Similarly, in a record 502 indicated in FIG. 5, values of "scanner=false" and "printer=true" are respectively registered to be associated with a URL of "http://www.hoge2.html". This state indicates that the printer 240 has to be activated and the scanner 250 has not to be activated when the Web browser 420 accesses the URL of "http://www.hoge2.html".

And, in a record 503, values of "scanner=true" and "printer=true" are respectively registered to be associated with a URL of "http://www.hoge3.html". This state indicates that both the printer 240 and the scanner 250 have to be activated when the Web browser 420 accesses the URL of "http://www.hoge3.html".

Here, although the necessity or non-necessity of activating the printer and the scanner are indicated by two values of "true" or "false", in a case that not only two modes of the normal power mode and the power saving mode but also the power saving modes of plural levels exist, values for indicating respective levels may be registered.

In addition, although it is assumed that the content of the table indicated in FIG. 5 can be registered and updated on the basis of information received from the Web server 102, it is allowed that the content can be registered and updated by a manner that an administrator of the MFP 101 operates the operation unit 230.

Figure 6:
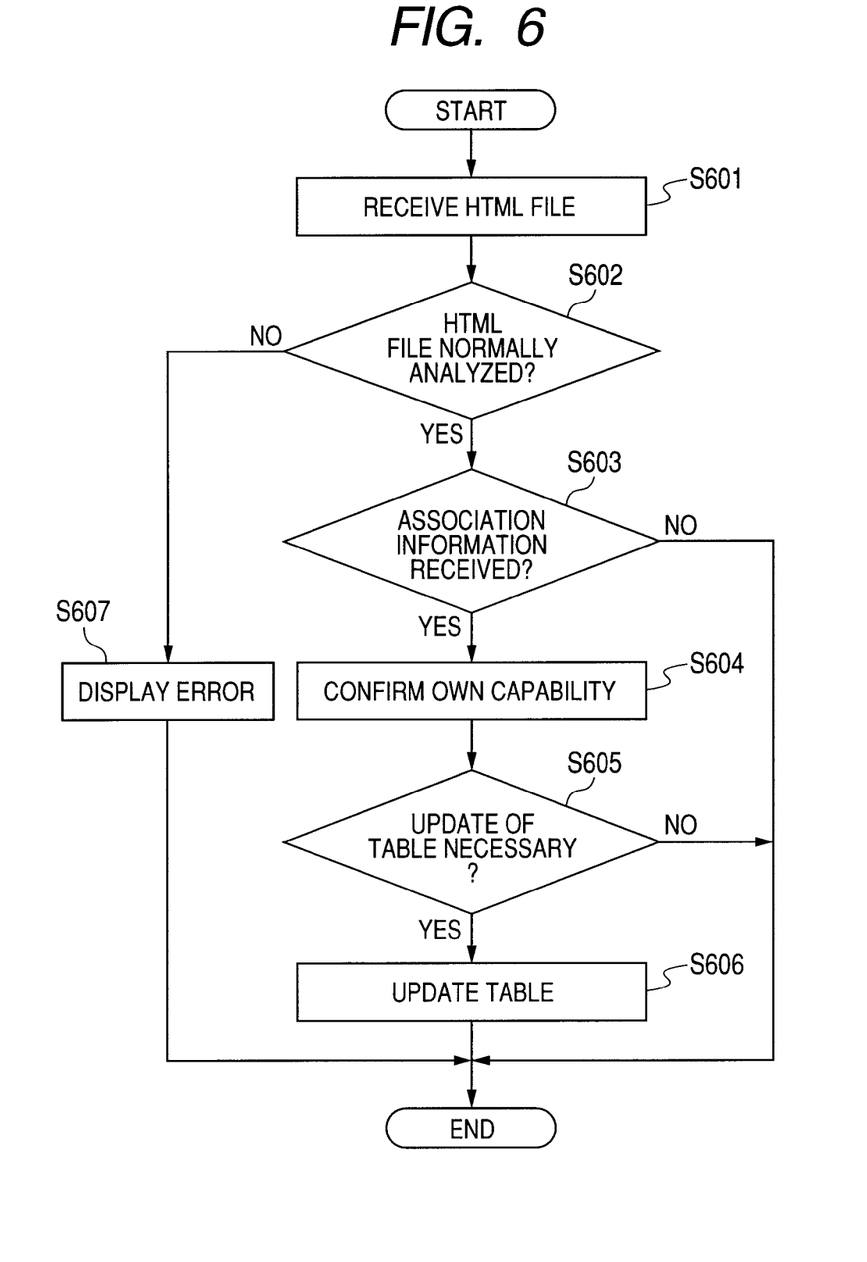
FIG. 6 is a flow chart for describing an operation of the MFP 101 according to the embodiment of the present invention.

FIG. 6 is a flow chart for describing a series of processes of updating the registered content of the information table 440 when the Web browser 420 of the MFP 101 received an HTML file used for displaying an operation screen from the Web server 102. Respective operations (steps) indicated in the flow chart of FIG. 6 can be realized by a process that the CPU 211 of the MFP 101 performs control programs stored in the HDD 220.

In S601, the HTML file transmitted from the Web server 102 is received responding to a request from the Web browser 420 and then the description of the HTML file is analyzed.

In S602, it is judged whether or not the analysis of the HTML file performed in S601 is normally terminated. When the analysis is normally performed, a flow advances to S603 and when the analysis is not normally performed, a flow advances to S607. In S607, the Web browser 420 displays an error screen and the process is terminated as it is.

In S603, it is judged whether or not information used for associating a URL with a processing unit to be activated is received when the HTML file is received in S601. As a result of this judgment, when the information is received, a flow advances to S604 and the own capability of the MFP 101 is confirmed. For example, even if information of indicating that the scanner has to be activated is transmitted from the Web server 102, when the MFP 101 does not have the scanner, the table is not required to update. Consequently, it can be judged whether or not the table has to be updated on the basis of the information received from the Web server 102 by confirming the own capability of the MFP 101.

In S605, it is judged whether or not the registered content of the information table 440 has to be updated on the basis of the confirmed result obtained in S604. When it was judged that the table has to be updated, a flow advances to S606 and the registered content of the information table 440 is updated. When it was judged that the table has not to be updated, the process is terminated as it is.

Figure 7:
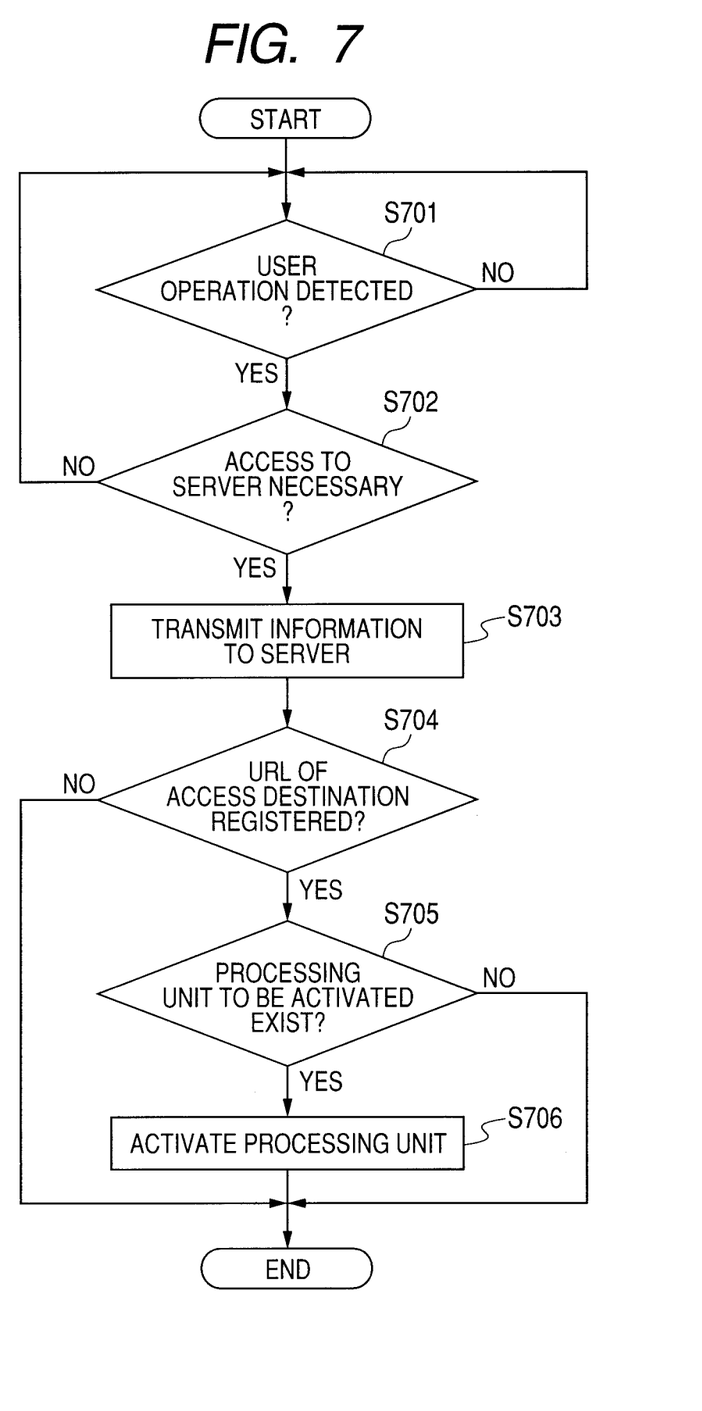
FIG. 7 is a flow chart for describing an operation of the MFP 101 according to the embodiment of the present invention.

FIG. 7 is a flow chart for describing a series of processes of activating the processing units in accordance with the content of detected user operation when the Web browser 420 transmits information to the Web server 102 upon detecting the user operation performed through the operation screen displayed on the Web browser 420. Respective operations (steps) indicated in the flow chart of FIG. 7 are realized by a process that the CPU 211 of the MFP 101 performs control programs stored in the HDD 220.

In S701, the user operation performed through the operation screen displayed on the Web browser 420 is detected. When the user operation was detected, a flow advances to S702, and when the user operation is not detected, it must be waited until the user operation is detected.

In S702, it is judged whether or not the content of user operation requires to access the Web server 102. A case of requiring to access the Web server 102 is, for example, such a case that a URL included in the HTML file of the operation screen is designated and a Web page corresponding to this URL is obtained. Or it is a case that various parameters input by a user through the operation screen or an instruction of performing the process is notified to the Web server 102. Meanwhile, if it is an operation that a desired parameter is selected from a drop-down list to be displayed on the operation screen or a character string is input, it is not required to access the Web server 102.

In S702, when it is judged that the content of user operation requires to access the Web server 102, a flow advances to S703, and when it is judged that the content of user operation does not require to access the Web server 102, a flow returns to S701, and it must be waited until a new user operation is detected.

In S703, information corresponding to the content of user operation performed through the operation screen is transmitted to the Web server 102 and then a flow advances to S704.

In S704, it is judged whether or not the URL used as an access destination in S703 is registered in the information table 440. As a result of this judgment, when it is judged that the URL is registered, a flow advances to S705, and when it is judged that the URL is not registered, the process is terminated as it is.

In S705, a processing unit which is registered associated with the URL used as the access destination is specified and it is judged whether or not the specified processing unit should be activated. More specifically, in an example indicated in FIG. 5, when the URL of "http://www.hoge1.html" was used as the access destination, as the processing unit to be activated, the scanner 250 is specified. And, it is judged whether or not the scanner 250 is in a state of currently activating, and if the scanner 250 is in a state of not activating, it is judged that the scanner 250 has to be activated, and a flow advances to S706. In S705, when it was judged that the processing unit to be activated does not exist, the process is terminated as it is.

In S706, the processing unit is activated by shifting the processing unit to be activated from a state of currently operating at the power saving mode to a state of operating at the normal power mode (that is, it is started to supply the power by controlling one or plural switches among the switches 221, 241 and 251).

As mentioned above, in the present embodiment, the user operation performed through the operation screen displayed on the Web browser is detected, and the processing unit is made to be activated in accordance with the content of the detected user operation when the Web browser transmits the information to the Web server. Consequently, even in the case that the Web server provides the operation screen and the user instructs to perform the process through the operation screen displayed on the Web browser, the time elapsed from when the user instructs to perform the process until when the job is started to be performed can be shortened.

Other Embodiments

Aspects of the present invention can also be realized by a computer of a system or apparatus (or a device such as a CPU or an MPU) that reads out and performs a program recorded on a memory device to perform the functions of the above-described embodiment, and by a method, the steps of which are performed by a computer of a system or an apparatus by, for example, reading out and performing a program recorded on a memory device to perform the functions of the above-described embodiment. For this purpose, the program is provided to the computer for example through a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-152625, filed Jun. 26, 2009, which is hereby incorporated by reference herein in its entirety.

What is claimed is:

1. An information processing apparatus which communicates with a Web server and is equipped with a Web browser for displaying an operation screen provided by the Web server, comprising:
    a plurality of processing units configured to respectively perform processes on image data;
    a registration unit configured to register at least one processing unit of the plurality of processing units in association with a specific uniform resource locator;
    a judgment unit configured to judge whether or not a uniform resource locator that the web browser accesses is the specific uniform resource locator; and
    a control unit configured to, in a case where it is judged by the judgment unit that the uniform resource locator that the web browser accesses is the specific uniform resource locator, activate the at least one processing unit of the plurality of processing units registered by the registration unit in association with the specific uniform resource locator.

2. An information processing apparatus according to claim 1, wherein the plurality of processing units can operate in either a normal power mode or a power saving mode of which power consumption is smaller than in the normal power mode, and the control unit activates the at least one processing unit by transitioning the at least one processing unit from the power saving mode to the normal power mode.

3. An information processing apparatus according to claim 1, further comprising a receiving unit configured to receive, from the Web server, information for associating the specific URL with the plurality of processing units.

4. An information processing apparatus according to claim 1, wherein the plurality of processing units perform the processes on the image data according to a request from the Web server based on information transmitted by the Web browser.

5. An information processing apparatus according to claim 1, wherein the plurality of processing units includes at least a reading unit configured to generate the image data by reading an image on an original or a printing unit configured to perform printing based on the image data.

6. A control method for an information processing apparatus which communicates with a Web server and is equipped with a Web browser for displaying an operation screen provided by the Web server and a plurality of processing units configured to respectively perform processes on image data, the method comprising:
    registering at least one processing unit of the plurality of processing units in association with a specific uniform resource locator;
    judging whether or not a uniform resource locator that the web browser accesses is the specific uniform resource locator; and
    in a case where it is judged that the uniform resource locator that the web browser accesses is the specific uniform resource locator, activating the at least one processing unit of the plurality of processing units registered in association with the specific uniform resource locator.

7. A non-transitory computer readable storage medium storing a program for causing a computer to perform the control method according to claim 6.

* * * * *